United States Patent [19]

Choi et al.

[11] Patent Number: 5,618,888
[45] Date of Patent: Apr. 8, 1997

[54] PROCESS FOR PREPARING EMULSION POLYMERS HAVING A HOLLOW STRUCTURE

[75] Inventors: Su B. Choi, Seo-ku; Tae H. Jang, Youseong-ku; Jin N. Yoo, Youseong-ku; Chan H. Lee, Youseong-ku, all of Rep. of Korea

[73] Assignee: LG Cehmical Ltd., Seoul, Rep. of Korea

[21] Appl. No.: 446,688

[22] PCT Filed: Oct. 20, 1994

[86] PCT No.: PCT/KR94/00141

§ 371 Date: Jun. 6, 1995

§ 102(e) Date: Jun. 6, 1995

[87] PCT Pub. No.: WO95/11265

PCT Pub. Date: Apr. 27, 1995

[30] Foreign Application Priority Data

Oct. 20, 1993 [KR] Rep. of Korea ................ 1993-22081

[51] Int. Cl.$^6$ ............................ C08F 285/00; C08F 2/22; C08J 9/28
[52] U.S. Cl. ........................ 525/301; 525/302; 525/308; 525/309; 525/312
[58] Field of Search ................................. 525/301, 302, 525/312, 308, 309

[56] References Cited

U.S. PATENT DOCUMENTS

| | | | |
|---|---|---|---|
| 4,427,836 | 1/1984 | Kowalski | 525/301 |
| 4,468,498 | 1/1984 | Kowalski | 525/301 |
| 4,677,003 | 6/1987 | Redlich | 427/373 |
| 4,876,313 | 10/1989 | Lorah | 525/281 |
| 4,916,171 | 4/1990 | Brown | 523/161 |
| 4,920,160 | 4/1990 | Chip | 523/201 |
| 4,970,241 | 11/1990 | Kowalski | 521/57 |
| 4,985,064 | 1/1991 | Redlich | 71/90 |
| 5,212,251 | 5/1993 | Lorah | 525/279 |
| 5,403,894 | 4/1995 | Tsai | 525/285 |
| 5,451,641 | 9/1995 | Eisenhart | 525/301 |

*Primary Examiner*—Irina S. Zemel
*Attorney, Agent, or Firm*—Birch, Stewart, Kolasch & Birch, LLP

[57] ABSTRACT

A process for preparing hollow polymer particles which comprises a seed-forming step for polymerizing a monomer mixture of an acid monomer having a carboxylic acid group and a non-ionic hydrophilic monomer in the presence of a polymerization initiator; a core-forming step for preparing a core, which can be swollen with an alkali, by polymerizing the monomer mixture of an acid monomer having a carboxylic acid group, a non-ionic hydrophilic monomer and a cross-linking agent to the seed latex; a shell-forming step in which a hydrophobic shell is formed on the hydrophilic core; and an alkali-swelling step.

12 Claims, No Drawings

PROCESS FOR PREPARING EMULSION POLYMERS HAVING A HOLLOW STRUCTURE

BACKGROUND OF THE INVENTION

The present invention relates to a process for preparing emulsion polymers having a hollow structure. More specifically, the present invention relates to a process for preparing emulsion polymers which comprises forming an internal layer with an alkali-swellable resin, carrying out a subsequential emulsion polymerization by means of a continuous variation in composition and a kinetic steric barrier to form a hard polymer layer outside the internal layer, swelling the internal layer with an alkali and then drying to remove water contained in the alkali-swellable resin, thereby forming a closed internal pore in the center of the polymer particle.

BACKGROUND ART

Emulsion polymers having a hollow structure have been widely used as a plastic pigment in the field of water-soluble paints, paper coating agents, information recording papers, synthethic resins and the like.

In the prior art, numerous methods for preparing plastic pigments having a hollow structure have been proposed as follows:

1) A method for preparing a hollow monocellular particle comprising polymerizing a mixture of monomers containing a blowing agent to prepare a plastic bead which is then blown under heating (see U.S. Pat. No. 3,615,972);

2) A method for preparing a polyester bead with a cavity having a diameter of 1 to 25 micron which comprises mechanically stirring a solution of polyester dissolved in styrene to prepare an emulsion of water/oil/water which is then polymerized (see U.S. Pat. No. 3,891,577);

3) A method for preparing a hollow particle comprising adding a volatile material to a polymer and then gasifying the volatile material to swell the polymer (see Japanese Patent No. 252635/1985);

4) A method for including vesicles into a dissolved polymer by dissolving a polymer and then blowing a gas such as air, etc., therein; and 5) A method for preparing a hollow particle which comprises swelling a polymer particle having a glass transition temperature of −10° C. or more with hot air in the spray dryer and then immediately cooling the swollen polymer to normal temperature (see Japanese Laid-open Patent Publication No. (Hei) 4-145131).

Although the polymer beads prepared according to the prior methods as mentioned above have a self-hiding property and therefore can serve as a pigment, these prior methods have some disadvantages in that the particle size cannot be uniformly controlled, and these methods cannot properly play the role of a dispersing agent of titanium oxide; they contribute poorly to the critical surface porosity and tend to precipitate during the storage; and further the pore size and shell thickness are difficult to control.

In addition, Japanese Patent Publication No. 44282/88 discloses a method for preparing a hollow particle by phase separation and polymerization shrinkage. However, this method also has disadvantages that the hollow portion is not smooth and the method cannot be practically used on an industrial scale because of the high material cost resulting from the massive use of a cross-linking agent.

In order to improve the disadvantages in such prior methods for preparing plastic pigments having hollow particles, a method for producing hollow particles by preparing a core-shell polymer having an alkali-swellable resin inside the particles via a multi-step continuous polymerization and then subjecting the polymer to alkali swelling and drying has been developed. This multi-step continuous polymerization process is influenced by the composition and glass transition temperature of monomers used in each polymerization step, the kind and concentration of the emulsifying agent, and the kind and concentration of the polymerization initiator, reaction temperature, etc. Further, the method using alkali-swelling procedures tends to produce a reverse core-shell polymer or a confetti-like abnormal structure due to the hydrophilicity of the polymers present inside the particles, which is far greater than that of polymers present on the outer shell of particles. Accordingly, numerous methods have been proposed for inhibiting the formation of such abnormal particle structures.

For example, U.S. Pat. Specification No. 4,427,836 discloses a method which comprises polymerizing carboxylic acid-containing hydrophilic polymers in which the volume can be swollen two times or more with an aqueous solution of a volatile base at a first emulsion polymerization step and then a sheath of polymeric material through which the aqueous base solution can permeated, formed on the surface of a core by means a thermal or redox initiated emulsion polymerization at the second emulsion polymerization step. However, this method has the disadvantages that additional new particles are generated, the stability of the latex is poor, and the shell-forming monomers should be used in an amount of 10 times or more of the core-forming monomers for providing a uniform core-shell structure and therefore the shell becomes thick.

In addition, Korean Patent Publication No. 87-1808 discloses a method wherein a core is formed from the monomer mixture containing monomers having a carboxylic acid group followed by a shell-forming step. In order to effectively inhibit the formation of abnormal particles, a copolymer surfactant is used as an emulsifier and also the feeding rate of monomers, the kind of polymerization initiator and the reaction temperature are specifically selected. According to this method, the formation of new particles in each polymerization step can be inhibited. However, this method is not very useful for improveing in the hiding property since the copolymer surfactant, which is a strong electrolyte, present on the surface of the core causes an increase in the heterogeneity between the core polymer and the shell polymer which makes the adhesion of the hydrophobic shell and the hydrophilic core poor.

Meanwhile, Korean Patent Publication No. 93-830 discloses a method for preparing a emulsion polymer by forming a hydrophilic core with a seed formed from an acid monomer and a vinyl monomer and providing a hard sheath layer with a hydrophobic monomer outside the core, wherein the emulsion polymerization is carried out by adding a group transfer polymerization initiator or an oil-soluble initiator when the seed and the core/sheath layer are produced by emulsion polymerization in an aqueous system. This method can reduce the agglomeration of latex particles but has some disadvantages in that the use of an oil-soluble initiator results in the production of new suspension particles and the difference in hydrophilicity of core and sheath polymers makes the encapsulation efficiency poor.

SUMMARY OF THE INVENTION

Thus, the present inventors have extensively studied to develop a method which can prevent lowering of the encapsulation efficiency due to the great difference in hydrophilicity between a core polymer and a shell polymer and can produce monodisperse hollow particles of an emulsion polymer having a uniform hollow size and a uniform shell thickness. As a result, it has been determined that the encapsulation efficiency can be maximized by adding a cross-linking agent to the core and shell layers to minimize the mutual interdiffusion of the polymer chains, while the hydrophilicity is continuously altered from the inner layer to the outer layer of the shell. Therefore monodisperse hollow particle of an emulsion polymer consisting of a solid hydrophobic shell and having uniform hollow size and uniform shell thickness can be produced.

Accordingly, it is an object of the present invention to provide an improved process for preparing emulsion polymers having hollow structure.

It is another object of the present invention to provide a process for preparing emulsion polymers which comprises forming a core polymer with an alkali-swellable resin, carrying out subsequential emulsion polymerization by means of continuous variation in composition and a kinetic steric barrier to form a hard polymer shell outside the core, swelling the core with an alkali and then drying to remove water contained in the alkali-swollen core, thereby forming a closed internal pore in the center of polymer particle.

It is still another object of the present invention to provide a process for preparing the hollow particles of the emulsion polymer which comprises a seed-forming step for polymerizing the monomer mixture of an acid monomer having a carboxylic acid group and a non-ionic hydrophilic monomer in the presence of a polymerization initiator; a core-forming step for preparing a core, which can be swollen with an alkali, by polymerizing the monomer mixture of an acid monomer having a carboxylic acid group, a non-ionic hydrophilic monomer and a cross-linking agent to the seed latex; a step for forming the hydrophobic shell on the hydrophilic core; and an alkali-swelling step.

Further, it is another object of the present invention to provide a process for preparing hollow particles of the emulsion polymer having a single hollow in the center and a uniform thickness of the shell, wherein the process comprises as a seed-forming step polymerizing the mixed monomers of an acid monomer (i) having a carboxylic acid group and a non-ionic hydrophilic monomer (ii) in the presence of a polymerization initiator; a core-forming step for preparing a core, which can be swollen with an alkali, by polymerizing the monomer mixture of an acid monomer (i) having a carboxylic acid group, a non-ionic hydrophilic monomer (ii) and a cross-linking monomer (iii) to the seed latex; the step for forming the hydrophobic shell on the hydrophilic core; and an alkali-swelling step, characterized in that in the core/shell-forming steps, an emulsion (I) consisting of up to 10 wt % of a single or mixed acid monomer (i) having a carboxylic acid group, 85 to 100 wt % of a single or mixed non-ionic hydrophilic monomer (ii) and up to 5.0 wt % of a cross-linking monomer (iii) and an emulsion (II) consisting of 95 to 100 wt % of a single or mixed hydrophobic monomers (iv) and up to 5 wt % of a cross-linking agent (iii) are used in the ratio of 1/1–1/10 [emulsion (I)/emulsion (II)], the total amount of the emulsion (I) and the emulsion (II) is two times or more the weight of the core polymer, and the polymerization is carried out by continuously adding the emulsion (II) dropwise to the emulsion (I) and, at the same time, adding the emulsion (I) together with a water-soluble initiator to the core latex at the same rate as the addition of the emulsion (II) to the emulsion (I).

DETAILED DESCRIPTION OF

The process for preparing the hollow particles of emulsion polymers according to the present invention comprises a seed-forming step for polymerizing the monomer mixture of an acid monomer having a carboxylic acid group and a non-ionic hydrophilic monomer in the presence of a polymerization initiator; a core-forming step for preparing a core, which can be swollen with an alkali, by adding the monomer mixture of an acid monomer having a carboxylic acid group, a non-ionic hydrophilic monomer and a cross-linking agent to the seed latex; a step for forming the hydrophobic shell on the hydrophilic core; and an alkali-swelling step.

Although the seed-forming step and the core-forming step can be practiced according to conventional emulsion polymerization methods, the formation of the hydrophobic shell on the hydrophilic core polymer is substantially difficult from a technical view point.

That is, since the core polymer and the shell polymer have no miscibility due to the great difference in their hydrophilicity, in general, the shell polymer cannot completely encapsulate the core polymer, and therefore, a abnormal core-shell structure may be produced, in which the core polymer is partially encapsulated by the shell polymer, or discrete particles of the core polymer and the shell polymer are formed, in which the core polymer is not encapsulated by the shell polymer.

Accordingly, in the present invention, the shell is formed by providing an emulsion (I) consisting of an acid monomer, a non-ionic hydrophilic monomer and a cross-linking agent, and an emulsion (II) consisting of a hydrophobic monomer and a cross-linking monomer and then, when the shell-forming monomers are added to the core latex, slowly adding the emulsion (II) dropwise to the emulsion (I) and, at the same time, adding the emulsion (I) partly containing emulsion (II) to the core latex at the same rate as the addition of the emulsion (II) to the emulsion (I). According to this procedure, the production of particles having abnormal structure due to the difference in hydrophilicity can be prevented, the mutual interdiffusion of polymer chains due to cross-linking can be minimized and further the viscosity at the polymerization loci can be optimally controlled to maximize the encapsulation efficiency.

Then, the hollow particles of emulsion polymer according to the present invention can be prepared by swelling the final latex with alkaline solution. Since the resulting hollow particles are completely encapsulated by the hard hydrophobic shell, the destruction of hollow during the drying the latex can be prevented and therefore the final latex can be used in the area of paints and paper coating industries.

Hereinafter, the present invention will be more specifically illustrated.

The preparation of the seed latex is a pre-step for preparing the core latex. In this step, the monomer mixture of the acid monomer (i) and the non-ionic hydrophilic monomer (ii) is polymerized in the presence of an emulsifier and a water-soluble polymerization initiator. As the acid monomer (i) for this purpose, any one selected from the group consisting of unsaturated carboxylic acids having a reactive double bond such as acrylic acid, methacrylic acid, crotonic acid, fumaric acid and itaconic acid can be used alone or in combination with one or more other monomers selected therefrom . Such acid monomer (i) is used in an amount of up to 10 wt % based on the weight of the monomer mixture.

The non-ionic hydrophilic monomers (ii) which can be used in the present invention can include methyl acrylate, ethyl acrylate, butyl (meth)acrylate, methyl methacrylate, 2-hydroxyethyl (meth) acrylate, 2-hydroxypropyl (meth) acrylate, dimethylaminoethyl (meth) acrylate, diethylaminoethyl (meth) acrylate, dimethylaminopropyl (meth) acrylate, acrylonitrile, vinyl acetate, vinyl pyridine, acrylamide, methacrylamide, N-methylol (meth)acrylamide, and the like. The non-ionic hydrophilic monomers should have a water-solubility of at least of 0.5%, more preferably at least of 1%. In the present invention, any non-ionic hydorphilic monomer selected from the above mentioned monomers can be used alone or in combination with one or more other monomer selected therefrom.

The polymerization initiator to be used for the seed latex and carrying out the subsequent reaction steps can be suitably and optionally selected from conventional initiators for thermal and redox reaction. Specific examples of the polymerization initiator which can be used in the present invention includes ammonium persulfate, potassium persulfate and sodium persulfate- Such polymerization initiator can also be used in the combination with a reducing agent such as sodium bisulfite or sodium formaldehyde sulfoxylate. The reaction temperature is maintained preferably at 70° to 90° C. when ammonium persulfate, potassium persulfate or sodium persulfate is used alone as the initiator. Alternatively, when the initiator is used in the combination with a reducing agent selected from sodium bisulfite and sodium formaldehyde sulfoxylate, the reaction temperature can be controlled preferably in the range of 30° to 70° C.

As the emulsifier an anionic, non-ionic or cationic emulsifier which is conventionally used in the emulsion polymerization can be used either alone or as the mixture thereof. Specific preferred example of the emulsifier which can be used in the present invention include rhodinates such as potassium rhodinate, sodium rhodinate, etc.; aliphatic sodium or potassium salts such as potassium oleate, potassium laurate, sodium laurate, sodium stearate, potassium stearate, etc., and sulfuric acid ester salts of aliphatic alcohols such as sodium lauryl sulfate; an anionic emulsifier, for example, alkylaryl sulfonates such as sodium dodecylbenzenesulfonate, sodium dialkylsulfosuccinate, formalin condensate of naphthalene sulfonic acid, and the like; a non-ionic emulsifier, for example, alkyl esters, alkyl ethers, alkylphenyl ethers, etc., of polyethyleneglycol, and the like. Among those emulsifiers, sodium lauryl sulfate, sodium dodecylbenzenesulfonate, sodium dioctylsulfosuccinate, formalin condensate of naphthalene sulfonic acid, alkylphenyl ethers of polyethyleneglycol, etc. can be more preferably used. As a cationic emulsifier, quaternary ammonium salts can be preferably used. However, when the aqueous dispersion is cationic, the cationic: emulsifier can be used alone or together with a non-ionic emulsifier. The emulsifier is preferably used in an amount of 0.1 to 10 wt % on the basis of the weight of monomers.

In the core-forming step a monomer mixture consisting of the acid monomer, the hydrophilic monomer and the cross-linking agent is used. For this purpose, the acid monomer which can be used is any one selected from the acid monomer (i) as mentioned above, either alone or in combination with-one or more other monomers selected therefrom, and is used preferably in an amount of 5 to 40 wt % on the basis of the weight of the monomer mixture. As the hydrophilic monomer, one selected from the hydrophilic monomer (ii) mentioned hereinbefore can be used either alone or in combination with one or more other monomer selected therefrom, preferably in an amount of 60 to 95 wt % on the basis of the weight of the monomer mixture. In this step, the cross-linking agent (iii) which can be used is selected from divinyl benzene, ethylenglycol di(meth)acrylate, trimethylol propane trimethacrylate, hexamethyleneglycol diacrylate, allyl methacrylate and the like. The cross-linking agent can be preferably used in an amount of 0.1 to 5.0 wt % on the basis of the weight of the monomer mixture.

The monomer mixture consisting of such acid monomer, hydrophilic monomer and cross-linking agent is slowly added to the seed latex together with the emulsifier and the water-soluble initiator to obtain the monodisperse core latex which can be swollen with an alkaline solution afterwards.

Preferably, the monomer composition which can be used in the emulsion (I) for the shell-forming step consists of up to 10 wt % of the acid monomer which is one, or the mixture of two or more, selected from the acid monomer (i) mentioned hereinbefore; 85 to 100 wt % of the hydrophilic monomer which is one, or the mixture of two or more, selected from the hydrophilic monomer (ii) mentioned hereinbefore; and up to 5.0 wt % of the cross-linking agent selected from the cross-linking agent (iii) mentioned hereinbefore.

The monomer mixture which is used in the emulsion (II) consists of the hydrophobic monomer and the cross-linking agent. As hydrophobic monomers (iv) for this purpose, one, or the mixture of two or more, selected from aromatic vinyl monomers such as styrene, methyl styrene, ethyl styrene, vinyl toluene, chlorostyrene, vinyl naphthalene, etc., can be used in an amount of 95 to 100 wt % on the basis of the weight of the monomer mixture. As the cross-linking agent for this purpose, any of the cross-linking agent (iii) is used preferably in an amount of up to 5.0 wt % on the basis of the weight of the monomer mixture.

The ratio of the emulsion (I) and the emulsion (II) is preferably in the range of $\frac{1}{1}$ to $\frac{1}{10}$ [emulsion (I)/emulsion (II)]. The total mixture of monomers for forming the shell polymer is used preferably in an amount of two times or more an amount of the core polymer on the basis of weight.

The emulsion (I) and the emulsion (II) thus prepared are added to the core latex as described below. Specifically, the emulsion (II) is slowly added to the emulsion (I) and, at the same time, the emulsion (I) partly containing emulsion (II) is added to the core latex together with the water-soluble initiator, at the same rate as the addition of the emulsion (II) to the emulsion (I), to obtain the monodisperse emulsion polymer having a perfect core/shell structure.

The resulting latex having the core/shell structure is adjusted to a pH of 6 to 12 with aqueous ammonium or a volatile base such as triethylamine, diethanolamine, triethanolamine, etc, or an organic base. It is then swollen for 30 minutes or more at a temperature in the range of 60° to 100° C. and then dried to obtain hollow particles having an outer diameter of 0.1 to 5 micron, and an inner diameter of 0.05 to 4 micron with an inner diameter/outer diameter ratio of 0.1 to 0.9 and a uniform shell thickness.

The particle and hollow size of the hollow latex particles obtained according to the present invention are observed by means of a transmission electron microscope (TEM).

The present invention is more specifically explained by the following examples. However, it should be understood that the present invention is not limited to those examples in any manner.

EXAMPLE 1

(1) Production of the seed latex

To a 2 L four-necked flask equipped with a stirrer, a thermometer, a refluxing condenser and a nitrogen inlet 300 g of deionized water was added and then the flask was purged with nitrogen gas while maintaining the temperature of 75° C. The emulsion consisting of 15 g of deionized water, 15 g of methyl methacrylate, 0.3 g of methacrylic acid and 0.3 g of an aqueous solution of sodium dodecylbenzene sulfonate (solid content: 12 wt %), which was prepared in advance, was introduced into the flask and then an aqueous solution of 0.12 g of potassium persulfate dissolved in 15 g of deionized water was added thereto. After the addition is completed, the reaction mixture was polymerized for 2 hours to obtain the monodisperse emulsion polymer having an average particle diameter of 0.08 micron.

(2) Production of the core latex

To the flask containing the seed latex was added 600 g of deionized water. Thereafter, the emulsion of 168 g of methyl methacrylate, 72 g of methacrylic acid, 1.2 g of ethyleneglycol dimethacrylate and 7.5 g of sodium dodecylbenzene sulfonate (solid content:12 wt %) in 144 g of deionized water and the aqueous solution of 0.96 g of potassium persulfate dissolved in 120 g of deionized water were slowly added dropwise thereto at the same rate over 4 hours at 75° C. The reaction mixture was polymerized for 2 hours to obtain the monodisperse emulsion polymer having an average particle diameter of 0.20 micron.

(3) Production of the core/shell latex 171 g of the core latex (solid content: 17.5 wt %), as prepared above, and 375 g of deionized water were added to a 2 L four-necked flask and then heated to 75° C. while purging the flask with nitrogen.

Separately, two kinds of the emulsion were prepared. One is the emulsion (I) prepared from 90 g of methyl methacrylate, 2.7 g of sodium dodecylbenzene sulfonate (solid content:12 wt %) and 54 g of deionized water and the other is the emulsion (II) prepared from 180 g of styrene, 1.5 g of divinyl benzene, 5.4 g of sodium dodecylbenzene sulfonate (solid content: 12 wt %) and 108 g of deionized water.

The prepared emulsion (II) was added to, and mixed with, the emulsion (I) at the constant rate and, at the same time, the emulsion (I) of which the composition is continuously varied according to the addition of the emulsion (II) was continuously added dropwise to the flask at the same rate as the addition of the emulsion (II) to the emulsion (I), over about 5 hours. Simultaneously, the aqueous solution of 1.08 g of potassium persulfate dissolved in 135 g of deionized water in another flask was added to the flask over the same period as the addition of the emulsion (I). Thereafter, the reaction mixture was allowed to polymerize and then aged for 2 hours to obtain the core/shell latex. The obtained core/shell latex comprises the monodisperse emulsion polymer of which the solid content is 25.6 wt % and the average particle diameter is 0.45 micron.

(4) Alkali swelling

The core/shell latex was continuously heated to 90° C. and then adjusted to pH 10.8 by adding aqueous ammonium (solid content:28 wt %) and swollen for 2 hours. The obtained latex was identified as being the monodisperse, spherical hollow particle having a hollow size of 0.3 micron and an average latex particle diameter of 0.5 micron.

EXAMPLE 2-7

The hollow particles were prepared by a multi-step emulsion polymerization according to the same procedures as Example 1 except that the emulsion (I) and the emulsion (II) having the compositions as described in Table 1 are used in perparation of the core/shell particle. The obtained results are described in Table 1.

EXAMPLE 8

The hollow particle was prepared by a multi-step emulsion polymerization according to the same procedures as Example 1 except that the emulsion (I) and the emulsion (II) having the compositions as described in Table 1 are used in preparation of the core/shell particle and the aqueous initiator solution comprises 0.9 g of potassium persulfate and 112 g of deionized water. The obtained results are described in Table 1.

EXAMPLE 9

The hollow particle was prepared by a multi-step emulsion polymerization according to the same procedures as Example 1 except that the emulsion (I) and, the emulsion (II) having the compositions as described in Table 1 are used in preparation of the core/shell particle and the aqueous initiator solution comprises 1.8 g of potassium persulfate and 225 g of aleionized water. The obtained results are described in Table 1.

EXAMPLE 10

The hollow particle was prepared by a multi-step emulsion polymerization according to the same procedures as Example 1 except that the emulsion (I) and the emulsion (II) having the compositions as described in Table 1 are used in preparation of the core/shell particle and the aqueous initiator solution comprises 0.72 g of potassium persulfate and 90 g of aleionized water. The obtained results are described in Table 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

Composition of the emulsions used in preparing the core/shell latex and the characteristics of the hollow particle prepared therefrom

| | EXAMPLES | | | | | | | | | |
|---|---|---|---|---|---|---|---|---|---|---|
| | 1 | 2 | 3 | 4 | 5 | 6 | 7 | 8 | 9 | 10 |
| Emulsion (I) | | | | | | | | | | |
| MMA | 90 | 90 | 90 | 90 | 90 | 90 | 90 | 45 | 90 | 60 |
| MAA | | | | | | | | 14 | | |
| EGDMA | | | | | 0.5 | 1.5 | | | | |
| SDBS a.s. | 2.7 | 2.7 | 2.7 | 2.7 | 2.7 | 2.7 | 2.7 | 1.35 | 2.7 | 1.8 |

TABLE 1-continued

Composition of the emulsions used in preparing the core/shell latex and the characteristics of the hollow particle prepared therefrom

| | EXAMPLES | | | | | | | | | |
|---|---|---|---|---|---|---|---|---|---|---|
| | 1 | 2 | 3 | 4 | 5 | 6 | 7 | 8 | 9 | 10 |
| WM Emulsion (II) | 54 | 54 | 54 | 54 | 54 | 54 | 54 | 27 | 54 | 36 |
| ST | 180 | 180 | 180 | 180 | 180 | 180 | 180 | 180 | 360 | 120 |
| DVB | 1.5 | 3.0 | 4.5 | 6.0 | 1.0 | | 1.5 | 1.5 | 2.5 | 2.0 |
| SDBS a.s. | 5.4 | 5.4 | 5.4 | 5.4 | 5.4 | 5.4 | 5.4 | 5.4 | 10.8 | 3.6 |
| WM | 108 | 108 | 108 | 108 | 108 | 108 | 108 | 108 | 216 | 72 |
| Outer diameter D (μm) | 0.5 | 0.55 | 0.5 | 0.5 | 0.5 | 0.524 | 0.5 | 0.525 | 0.65 | 0.4 |
| Inner diameter d (μm) | 0.3 | 0.375 | 0.3 | 0.325 | 0.275 | 0.275 | 0.3 | 0.15 | 0.45 | 0.26 |
| d/D ratio | 0.60 | 0.68 | 0.60 | 0.65 | 0.55 | 0.45 | 0.60 | 0.35 | 0.69 | 0.65 |

Note:
1) outer diameter = particle size
2) inner diameter = hollow size
3) MMA = methyl methacrylate
4) MAA = methacrylic acid
5) EGDMA = ethyleneglycole dimethacrylate
6) SDBS a.s. = 12 wt % aqueous solution of sodium dodecylbenzene sulfonate
7) ST = styrene
8) DVB = divinyl benzene

What is claimed is:

1. A process for preparing hollow polymer particles having a uniform hollow center and a uniform shell thickness, which comprises (1) a seed-forming step in which a monomer mixture consisting of (i) an acid monomer having a carboxylic acid group, and (ii) a non-ionic hydrophilic monomer is polymerized in the presence of a polymerization initiator to form a seed latex;

(2) a core-forming step for preparing core particles in which a monomer mixture of (i) an acid monomer having a carboxylic acid group, (ii) a non-ionic hydrophilic monomer, and (iii) a cross-linking agent is emulsion polymerized on the seed latex to form a hydrophilic core;

(3) a shell-forming step in which a hydrophobic shell is formed on the hydrophilic core; and in the shell-forming step (I) an emulsion comprising an emulsifier, water, and a monomer mixture of (i) up to 10 wt % of at least one acid monomer having a carboxylic acid group, (ii) 85 to 100 wt % of at least one non-ionic hydrophilic monomer, and (iii) up to 5 wt % of a cross-linking agent, and (II) an emulsion comprising an emulsifier, water, and a monomer mixture of (i) 95 to 100 wt % of at least one hydrophobic monomer and (ii) up to 5 wt % of a cross-linking monomer, are used in a ratio of 1/1 to 1/10 (emulsion (I)/emulsion (II)), the total amount of the monomer mixture in emulsion (I) and emulsion (II) being at least two times the weight of the core particles, carrying out the polymerization by continuously adding emulsion (II) dropwise to emulsion (I) and, at the same time, adding emulsion (I), partially containing emulsion (II), together with a water-soluble polymerization initiator to the core latex at the same rate as emulsion (II) is added to emulsion (I), to form a final latex, and swelling the final latex with an alkaline solution.

2. The process for preparing hollow polymer particles according to claim 1, wherein the hollow polymer particle has an outer diameter of 0.1 to 5 micron, an inner diameter of 0.05 to 4 micron, and an inner diameter/outer diameter ratio of 0.1 to 0.9.

3. The process for preparing hollow polymer particles according to claim 1, wherein the seed-forming step is carried out by polymerizing the monomer mixture consisting of the acid monomer having a reactive double bond and the nonionic hydrophilic monomer, wherein the acid monomer is present in an amount of up to 10 wt %, in the presence of an emulsifier and a water-soluble polymerization initiator.

4. The process for preparing hollow polymer particles according to claim 1, wherein the step for preparing the core particles is carried out by slowly adding dropwise to the seed latex the monomer mixture consisting of the acid monomer, the hydrophilic monomer and the cross-linking agent, wherein the acid monomer is a single component or in the form of a mixture and is present in an amount of 5 to 40 wt % on the basis of the weight of the monomer mixture, the hydrophilic monomer is present in an amount of 60 to 95 wt % on the basis of the weight of the monomer mixture and the cross-linking agent is present in an amount of 0.1 to 5.0 wt % on the basis of the weight of the monomer mixture, together with an emulsifier and a water-soluble polymerization initiator to obtain the monodisperse core latex.

5. The process for preparing hollow polymer particles according to claim 1, wherein the alkali-swelling step is carried out by adjusting the pH value of the latex having a core/shell structure with a volatile base or an organic base in the range of 6 to 12 and then swelling the latex for 30 minutes or more at a temperature of 60° to 100° C.

6. The process for preparing hollow polymer particles according to claim 13, wherein the acid monomer is selected from the group consisting of acrylic acid, methacrylic acid, crotonic acid, fumaric acid and iraconic acid.

7. The process for preparing hollow polymer particles according to claim 1, wherein the non-ionic hydrophilic monomer has the water solubility of 0.5 wt % or more.

8. The process for preparing hollow polymer particles according to claim 7 or 13, wherein the non-ionic hydrophilic monomer is selected from the group consisting of methyl acrylate, ethyl acrylate, butyl (meth) acrylate, methyl methacrylate, 2-hydroxyethyl (meth) acrylate, 2-hydroxypropyl (meth) acrylate, dimethylaminoethyl (meth) acrylate, diethylaminoethyl (meth) acrylate, dimethylaminopropyl (meth)acrylate, acrylonitrile, vinyl acetate, vinyl pyridine, acrylamide, methacrylamide and N-methylol (meth) acrylamide and mixtures thereof.

9. The process for preparing hollow polymer particles according to claim 1, wherein the cross-linking agent is selected from the group consisting of divinyl benzene, ethyleneglycol di(meth)acrylate, trimethylol propane trimethacrylate, hexamethyleneglycol diacrylate and allyl methacrylate.

10. The process for preparing hollow polymer particles according to claim 1, wherein the hydrophobic monomer is selected from the group consisting of styrene, methyl styrene, ethyl styrene, vinyl toluene, chlorostyrene and vinyl naphthanene.

11. The process for preparing hollow polymer particles according to claim 1, wherein the emulsifier is used in an amount of 0.1 to 10 wt % on the basis of the weight of the total monomers used in each step.

12. The process for preparing hollow polymer particles according to claim 1, wherein the water-soluble polymerization initiator is ammonium persulfate, potassium persulfate or sodium persulfate alone or in a combination with a reducing agent selected from sodium bisulfate and sodium formaldehyde sulfoxylate.

* * * * *